United States Patent
Tsutsui

(10) Patent No.: US 11,912,139 B2
(45) Date of Patent: Feb. 27, 2024

(54) ELECTRIC POWERED VEHICLE AND BATTERY PACK FOR ELECTRIC POWERED VEHICLE

(71) Applicant: TOYOTA JIDOSHA KABUSHIKI KAISHA, Toyota (JP)

(72) Inventor: Yusuke Tsutsui, Anpachi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 470 days.

(21) Appl. No.: 17/318,565

(22) Filed: May 12, 2021

(65) Prior Publication Data

US 2021/0394618 A1    Dec. 23, 2021

(30) Foreign Application Priority Data

Jun. 17, 2020 (JP) .................... 2020-104907

(51) Int. Cl.
| | |
|---|---|
| *B60L 3/00* | (2019.01) |
| *B60K 1/00* | (2006.01) |
| *B60K 1/04* | (2019.01) |
| *G06F 13/42* | (2006.01) |
| *B60L 50/60* | (2019.01) |
| *B60R 16/023* | (2006.01) |
| *B60W 50/023* | (2012.01) |
| *B60L 58/10* | (2019.01) |

(52) U.S. Cl.
CPC .......... *B60L 3/0092* (2013.01); *B60K 1/00* (2013.01); *B60K 1/04* (2013.01); *B60L 50/60* (2019.02); *B60L 58/10* (2019.02); *B60R 16/0232* (2013.01); *B60W 50/023* (2013.01); *G06F 13/4282* (2013.01)

(58) Field of Classification Search
CPC ........ B60L 3/0092; B60L 50/60; B60L 58/10; B60K 1/00; B60K 1/04; B60R 16/0232; B60W 50/023; G06F 13/4282
See application file for complete search history.

(56) References Cited

U.S. PATENT DOCUMENTS

| | | | |
|---|---|---|---|
| 9,612,289 B2 * | 4/2017 | Novak | .............. H01M 10/4257 |
| 10,780,795 B2 * | 9/2020 | Zuo | ..................... H01M 10/625 |

(Continued)

FOREIGN PATENT DOCUMENTS

| | | |
|---|---|---|
| JP | 2008-042985 A | 2/2008 |
| JP | 2012-217292 A | 11/2012 |

*Primary Examiner* — Tarek Elarabi
(74) *Attorney, Agent, or Firm* — Oliff PLC

(57) ABSTRACT

An electric powered vehicle may include a battery ECU housed in a battery pack and a vehicle ECU mounted on a vehicle body and communicably connected to the battery ECU. The vehicle ECU may be configured to transmit first and second identification data for detecting communication disruptions to the battery ECU. The battery ECU may be configured to: when the battery ECU receives both the first and the second identification data, determine that the battery ECU is communicably connected to the vehicle ECU and enable a predetermined mutual monitoring function for the vehicle ECU; and when the battery ECU receives the first identification data but does not receive the second identification data, determine that the battery ECU is communicably connected to another ECU other than the vehicle ECU and disable the mutual monitoring function for the vehicle ECU.

4 Claims, 2 Drawing Sheets

(56) References Cited

U.S. PATENT DOCUMENTS

| | | | |
|---|---|---|---|
| 2015/0377975 A1* | 12/2015 | Novak | H01M 10/482 |
| | | | 324/434 |
| 2020/0207237 A1* | 7/2020 | Zuo | H01M 10/6571 |
| 2021/0114535 A1* | 4/2021 | Ye | G07C 5/006 |
| 2021/0351953 A1* | 11/2021 | Yeom | H04L 12/40039 |

* cited by examiner

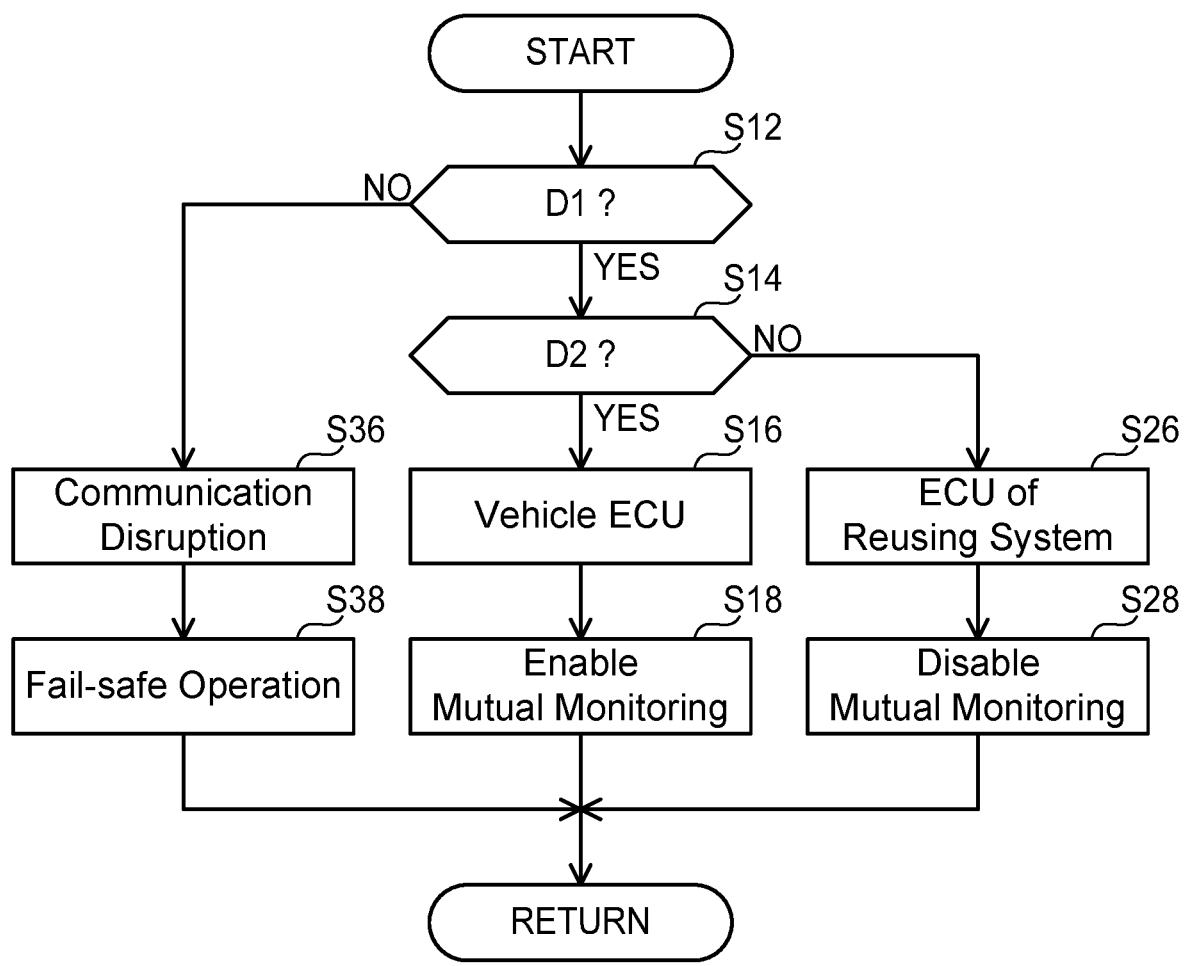

ELECTRIC POWERED VEHICLE AND BATTERY PACK FOR ELECTRIC POWERED VEHICLE

CROSS-REFERENCE TO RELATED APPLICATION

This application claims priority to Japanese Patent Application No. 2020-104907, filed on Jun. 17, 2020, the entire contents of which are incorporated herein by reference.

TECHNICAL FIELD

The art disclosed herein relates to an electric powered vehicle and a battery pack for an electric powered vehicle.

BACKGROUND

In recent years, electric powered vehicles have been widely popularized. In connection to this, Japanese Patent Application Publication No. 2008-42985 describes a battery pack for an electric powered vehicle. This battery pack is provided with a battery ECU (Electronic Control Unit), and the battery ECU is communicably connected to an ECU mounted on the electric powered vehicle (hereinbelow termed a vehicle ECU). Generally, an electric powered vehicle includes various fail-safe designs, and a relatively sophisticated mutual monitoring function is incorporated for mutual communication between a battery ECU and a vehicle ECU.

SUMMARY

As electric powered vehicles are popularized, a large number of battery packs are manufactured and discarded. In view of this, it has been considered to reuse battery packs for electric powered vehicles as power sources in facilities, stores, and the like. Here, reusing a battery pack for an electric powered vehicle in another application without making any modifications to it requires an ECU of a system in which the battery pack is to be reused (hereinbelow, a system in which a battery pack is reused or is to be reused will be termed "battery-pack reusing system") to also have the sophisticated mutual monitoring function of the battery ECU. However, it is not typically expected that in the facility or store where the battery pack is to be reused, a fail-safe design equivalent to that of the electric powered vehicle is required. Therefore, providing the mutual monitoring function to an ECU of a battery-pack reusing system, just to match the battery ECU, may bring forth an unnecessary cost increase.

In view of the foregoing, the disclosure herein provides art that facilitates reuse of a battery pack for an electric powered vehicle in another application.

An electric powered vehicle disclosed herein may comprise a vehicle body comprising a traction motor; a battery pack mounted on the vehicle body and configured to supply electric power to the traction motor; a battery ECU housed in the battery pack; and a vehicle ECU mounted on the vehicle body and communicably connected to the battery ECU. The vehicle ECU may be configured to transmit first identification data and second identification data for detecting communication disruptions to the battery ECU. The battery ECU may be configured to, when the battery ECU receives both the first identification data and the second identification data, determine that the battery ECU is communicably connected to the vehicle ECU and enable a predetermined mutual monitoring function for the vehicle ECU; and when the battery ECU receives the first identification data but does not receive the second identification data, determine that the battery ECU is communicably connected to another ECU other than the vehicle ECU and disable the mutual monitoring function for the vehicle ECU.

In the above-described electric powered vehicle, the battery ECU housed in the battery pack is configured to monitor receipt of the first identification data and the second identification data in mutual communication with an ECU of apparatus or system to which the battery ECU is applied (such as the vehicle ECU). When the battery ECU receives both the first identification data and the second identification data, the battery ECU determines that it is communicably connected to the vehicle ECU. Contrary to this, when the battery ECU receives the first identification data but does not receive the second identification data, the battery ECU determines that it is communicably connected to another ECU other than the vehicle ECU, such as an ECU of a battery-pack reusing system. Thus, while the battery pack is mounted on the electric powered vehicle, fail-safe performance required for the electric powered vehicle can be satisfied by the battery ECU executing the mutual monitoring function with the vehicle ECU. On the other hand, once the battery pack is applied in a battery-pack reusing system, the battery ECU autonomously determines the change in application and disables the mutual monitoring function which is not required therein. Therefore, it is sufficient to provide the ECU of the battery-pack reusing system with a function of sending the first identification data, and significant modifications are not required. Also, the battery pack does not require special modifications either when applied in the battery-pack reusing system. This facilitates reuse of the battery pack for the electric powered vehicle in another application.

A battery pack for an electric powered vehicle is also disclosed herein. The electric powered vehicle may comprise a vehicle body comprising a traction motor and a vehicle ECU mounted on the vehicle body. The vehicle ECU may be configured to output first identification data and second identification data for detecting communication disruptions to a battery ECU. The battery pack may comprise at least one battery cell configured to supply electric power to the traction motor and the battery ECU communicably connected to the vehicle ECU when mounted on the electric powered vehicle. The battery ECU may be configured to, when the battery ECU receives both the first identification data and the second identification data, determine that the battery ECU is communicably connected to the vehicle ECU and enable a predetermined mutual monitoring function for the vehicle ECU; and when the battery ECU receives the first identification data but does not receive the second identification data, determine that the battery ECU is communicably connected to another ECU other than the vehicle ECU and disable the mutual monitoring function for the vehicle ECU.

The above battery pack also ensures that the battery ECU executes the mutual monitoring function for the vehicle ECU while the battery pack is mounted on the electric powered vehicle. When the battery pack is applied in a battery-pack reusing system, the battery ECU can stop executing the mutual monitoring function which is unnecessary therein. Thus, this battery pack for the electric powered vehicle can facilitate reuse of the battery pack in another application.

BRIEF DESCRIPTION OF DRAWINGS

FIG. 3 is a flowchart for explaining a series of processes executed by a battery ECU 26.

DETAILED DESCRIPTION

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electric powered vehicles and battery packs therefor, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
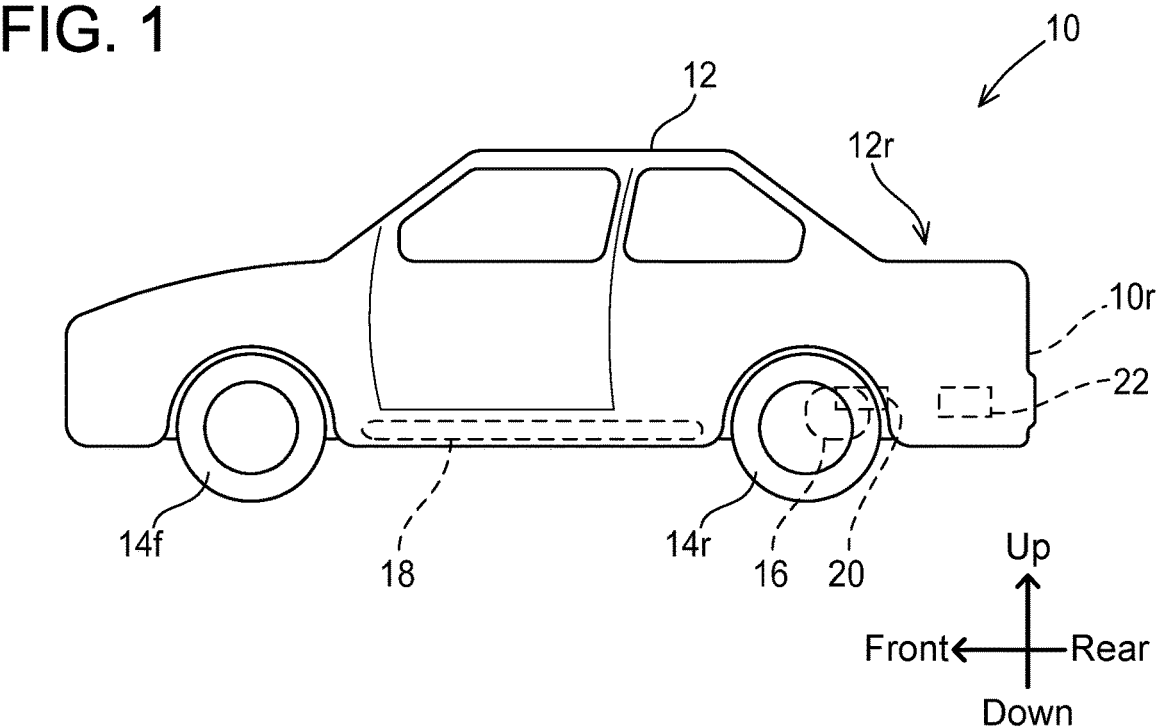
FIG. 1 schematically shows a configuration of an electric powered vehicle 10 according to an embodiment.
Figure 2:
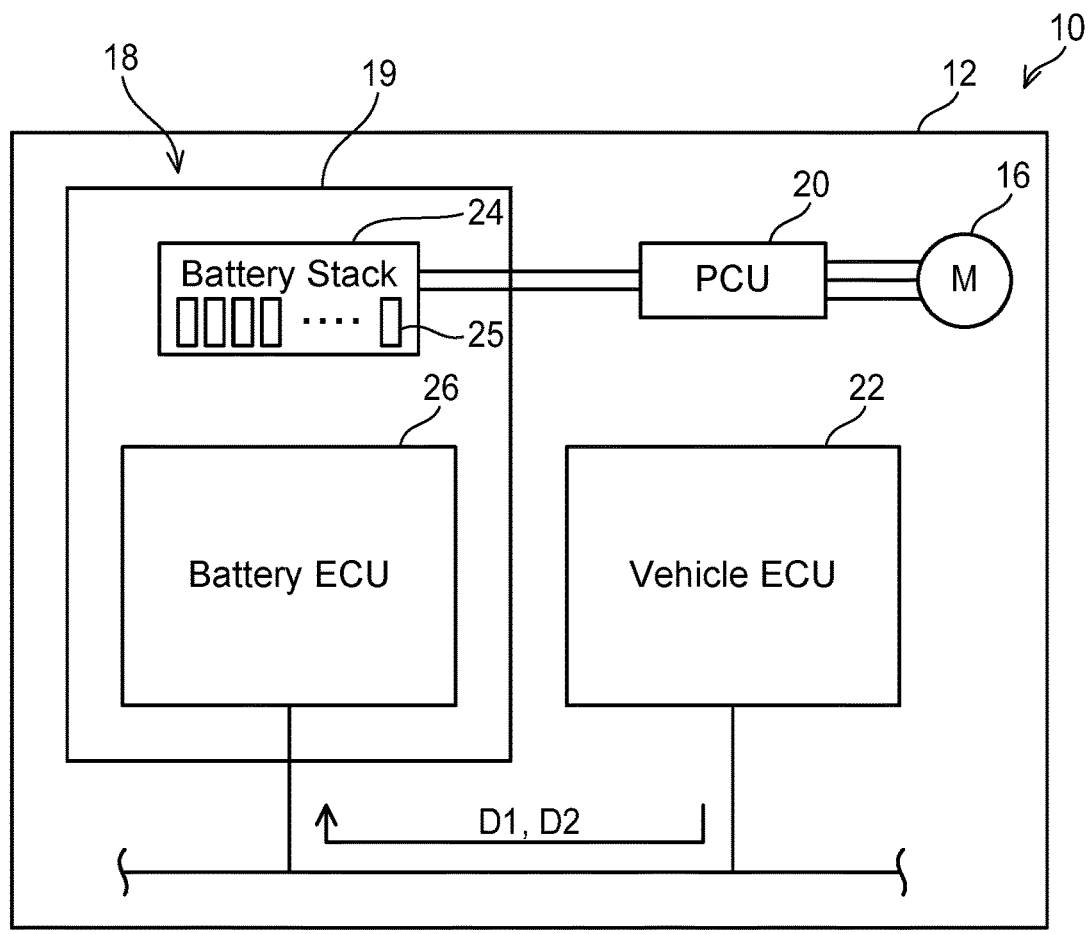
FIG. 2 is a block diagram showing a primary configuration of the electric powered vehicle 10.

An electric powered vehicle 10 according to an embodiment will be described with reference to FIGS. 1 and 2. As shown in FIG. 1, the electric powered vehicle 10 includes a vehicle body 12 and a plurality of wheels 14f, 14r supporting the vehicle body 12. Although not particularly limited, the vehicle body 12 is constituted primarily of metal. A passenger compartment and a luggage compartment are defined within the vehicle body 12. Each of the plurality of wheels 14f, 14r is rotatably attached to the vehicle body 12. The plurality of wheels 14f, 14r includes a pair of front wheels 14f and a pair of rear wheels 14r. The number of the wheels 14f, 14r is not limited to four.

The vehicle body 12 includes a traction motor 16, a battery pack 18, a PCU (Power Control Unit) 20, and a vehicle ECU (Electronic Control Unit) 22. The traction motor 16 is configured to drive at least one of the wheels 14f, 14r (e.g., the pair of rear wheels 14r). The battery pack 18 is connected to the traction motor 16 via the PCU 20.

The PCU 20 includes, for example, a power converter (not shown) such as a DC-DC converter and/or an inverter, and is configured to control electric power supplied from the battery pack 18 to the traction motor 16. The traction motor 16, the battery pack 18, and the PCU 20 are so-called high-voltage components, which are electric components that operate at an AC voltage exceeding 30 volts or a DC voltage exceeding 60 volts.

The vehicle ECU 22 is a low-voltage component and is mounted in a relatively rear portion of the electric powered vehicle 10. The vehicle ECU 22 is communicably connected to each of ECUs that control the traction motor 16 mounted on the electric powered vehicle 10 and components such as the battery pack 18 to be described later. Although not particularly limited, a serial communication protocol such as CAN (Controller Area Network) is employed in communication between the plurality of ECUs including the vehicle ECU 22 in the electric powered vehicle 10 according to the present embodiment. The vehicle ECU 22 includes a processor and a memory (not shown). The processor of the vehicle ECU 22 is configured to execute various types of control including instructions to the respective ECUs based on a program stored in advance in the memory and information from the respective ECUs and sensors.

The battery pack 18 is arranged along a floor of the vehicle body 12. As shown in FIG. 2, the battery pack 18 includes a battery casing 19, a battery stack 24, and a battery ECU 26. The battery casing 19 has a box-like shape, in which the battery stack 24 and the battery ECU 26 are housed. The battery stack 24 includes a plurality of battery cells 25 and is configured to be charged and discharged repeatedly. Typically, the battery stack 24 is charged with electric power supplied from an external power source (e.g., a charging station). The battery stack 24 is connected to the traction motor 16 via the PCU 20 and is configured to supply electric power to the traction motor 16. The battery stack 24 is also configured to be charged, via the PCU 20, with regenerative electric power generated in the traction motor 16.

As described, the battery ECU 26 is communicably connected to the vehicle ECU 22. However, the communication between the vehicle ECU 22 and the battery ECU 26 may be unintentionally disrupted due to, for example, a physical abnormality in a communication circuit. In this case, the battery ECU 26 needs to be able to promptly detect such communication disruption and take necessary actions such as prohibiting or limiting discharge of the battery stack 24. In order to do so, in the electric powered vehicle 10 according to the present embodiment, the vehicle ECU 22 sends first identification data D1 and second identification data D2 to the battery ECU 26, for example, at predetermined intervals. The battery ECU 26 recognizes that it can communicate with the vehicle ECU 22 by receiving the first identification data D1 and the second identification data D2. In order to detect a communication disruption between the two ECUs 22 and 26, normally use of only single piece of identification data is sufficient, and use of the two pieces of identification data D1 and D2 is not necessarily needed. However, in the electric powered vehicle 10 according to the present embodiment, the two pieces of identification data D1, D2 are used on the assumption that the battery pack 18 may be reused. This will be described later in detail.

When the battery ECU 26 recognizes that it can communicate with the vehicle ECU 22, the battery ECU 26 executes a predetermined mutual monitoring function for the vehicle ECU 22. Thereby, when something abnormal occurs in the operation of the battery ECU 26, for example, the abnormality can be immediately detected by the vehicle ECU 22. Similarly, when something abnormal occurs in the operation of the vehicle ECU 22, the abnormality can be immediately detected by the battery ECU 26. Particularities of the mutual monitoring function are not particularly limited. For example, the battery ECU 26 may send a predetermined request signal to the vehicle ECU 22. When receiving the request signal, the vehicle ECU 22 may send an answer signal corresponding to the request signal to the battery ECU 26. Then, the battery ECU 26 may determine that the vehicle ECU 22 is operating normally by receiving the answer signal. If, for example, an abnormality is detected in the vehicle ECU 22 as a result of the mutual monitoring function having been executed, the battery ECU 26 executes a fail-safe operation corresponding to the abnormality. An example of this fail-safe operation is an operation to prohibit or limit charging and discharging of the battery stack 24, although not particularly limited thereto.

The battery pack 18 in the present embodiment is expected to be reused as a power source, for example, in a facility or store. However, reusing the battery pack 18 for the electric powered vehicle 10, as it is, in another application requires an ECU of a battery-pack reusing system to also have the sophisticated mutual monitoring function of the battery ECU 26. However, in the facility or store where the battery pack 18 is expected to be reused, a fail-safe design equivalent to that of the electric powered vehicle 10 is not required typically. Thus, providing the mutual monitoring function to the ECU of the battery-pack reusing system, just to match the battery ECU 26, could bring an unnecessary cost increase.

In view of this, in the electric powered vehicle 10 according to the present embodiment, the battery ECU 26 determines that it is communicably connected to another ECU other than the vehicle ECU 22 when it receives the first identification data D1 but does not receive the second identification data D2, and disables the aforementioned mutual monitoring function for the vehicle ECU 22. That is, even when the second identification data D2 cannot be received, the battery ECU 26 operates as usual, although it disables the mutual monitoring function, so long as it receives the first identification data D1. According to such a configuration, it is sufficient to provide a function of sending the first identification data D1 in the ECU of the battery-pack reusing system, and there is no need to provide the mutual monitoring function therein, as in the vehicle ECU 22. When the battery pack 18 is applied in the battery-pack reusing system, the battery ECU 26 can autonomously recognize the change in application and stop the mutual monitoring function which is unnecessary therein. Thus, a special modification to the battery pack 18 is not required to apply the battery pack 18 in the battery-pack reusing system, and thereby the reuse of the battery pack 18 in another application can be facilitated.

FIG. 3 shows a series of processes executed by the battery ECU 26. By executing the series of processes shown in FIG. 3, the battery ECU 26 enables the mutual monitoring function while mounted on the electric powered vehicle 10 and disables the mutual monitoring function after applied to the battery-pack reusing system. Hereinbelow, the series of processes shown in FIG. 3 will be described, however, this is merely an example and does not place any limitation on the configuration of the battery ECU 26.

In step S12, the battery ECU 26 determines whether it has received the first identification data D1 or not. If the battery ECU 26 has received the first identification data D1 (YES in S12), the battery ECU 26 proceeds to a process of step S14. If the battery ECU 26 has not received the first identification data D1 (NO in S12), the battery ECU 26 proceeds to a process of step S36.

In step S14, the battery ECU 26 determines whether it has received the second identification data D2 or not. If the ECU 26 has received the second identification data D2 (YES in S14), the battery ECU 26 determines that it is communicably connected to the vehicle ECU 22 (step S16) and enables the mutual monitoring function for the vehicle ECU 22 (step S18).

If the battery ECU 26 has not received the second identification data D2 (NO in S14), the battery ECU 26 determines that it is communicably connected to the ECU of the battery-pack reusing system (step S26) and disables the mutual monitoring function for the vehicle ECU 22 (step S28).

If proceeding from step S12 to the process of step S36, the battery ECU 26 determines that communication with the communication counterpart ECU is disrupted and executes the fail-safe operation (step S38). When the series of processes of steps S12 to S38 has been completed, the battery ECU 26 returns to step S12.

As above, according to the series of processes shown in FIG. 3, the battery pack 18 can execute the mutual monitoring function required between the battery ECU 26 and the vehicle ECU 22 while it is mounted on the electric powered vehicle 10. On the other hand, when the battery pack 18 is applied in the battery-pack reusing system, the battery ECU 26 can autonomously recognize the change in application and stop the mutual monitoring function which is unnecessary therein. In order to make the above determination, the battery ECU 26 uses both the first identification data D1 and the second identification data D2 as identification data for detecting a communication disruption. The first identification data D1 is common identification data that is used in both the electric powered vehicle 10 and the battery-pack reusing system. The second identification data D2 is vehicle-dedicated identification data that is used solely in the electric powered vehicle 10. Using these pieces of identification data in combination enables the battery pack 18 for the electric powered vehicle 10 to be reused in another application, and thus vehicle electrification can be promoted.

What is claimed is:

1. An electric powered vehicle, comprising:
   a vehicle body comprising a traction motor;
   a battery pack mounted on the vehicle body and configured to supply electric power to the traction motor;
   a battery ECU housed in the battery pack; and
   a vehicle ECU mounted on the vehicle body and communicably connected to the battery ECU,
   wherein
   the vehicle ECU is configured to transmit first identification data and second identification data for detecting communication disruptions to the battery ECU, and
   the battery ECU is configured to:
      when the battery ECU receives both the first identification data and the second identification data, determine that the battery ECU is communicably connected to the vehicle ECU and enable a predetermined mutual monitoring function for the vehicle ECU; and
      when the battery ECU receives the first identification data but does not receive the second identification data, determine that the battery ECU is communicably connected to another ECU other than the vehicle ECU and disable the mutual monitoring function for the vehicle ECU.

2. The electric powered vehicle according to claim 1, wherein the vehicle ECU and the battery ECU are communicably connected by a serial communication protocol.

3. The electric powered vehicle according to claim 2, the serial communication protocol is Controller Area Network (CAN).

4. A battery pack for an electric powered vehicle, wherein the electric powered vehicle comprises a vehicle body comprising a traction motor and a vehicle ECU mounted on the vehicle body, the vehicle ECU being configured to output first identification data and second identification data for detecting communication disruptions to a battery ECU, the battery pack comprises at least one battery cell configured to supply electric power to the traction motor and the battery ECU communicably connected to the vehicle ECU when mounted on the electric powered vehicle, wherein the battery ECU is configured to:
  when the battery ECU receives both the first identification data and the second identification data, determine that the battery ECU is communicably connected to the vehicle ECU and enable a predetermined mutual monitoring function for the vehicle ECU; and
  when the battery ECU receives the first identification data but does not receive the second identification data, determine that the battery ECU is communicably connected to another ECU other than the vehicle ECU and disable the mutual monitoring function for the vehicle ECU.

\* \* \* \* \*